United States Patent [19]

Maciag et al.

[11] Patent Number: 4,758,202

[45] Date of Patent: Jul. 19, 1988

[54] UNIVERSAL JOINT WITH BEARING CUPS HAVING INTEGRAL BEARING SURFACES

[75] Inventors: Walter J. Maciag, Bay Village; Ralph E. Storey, Westlake, both of Ohio

[73] Assignee: Walter J. Maciag, Bay Village, Ohio

[21] Appl. No.: 863,594

[22] Filed: May 14, 1986

Related U.S. Application Data

[63] Continuation-in-part of Ser. No. 625,303, Jun. 27, 1984, abandoned.

[51] Int. Cl.⁴ .................. F16D 3/40; F16C 33/02
[52] U.S. Cl. .................. 464/128; 384/276; 464/132; 464/136
[58] Field of Search .................. 384/276, 282, 283; 464/8, 9, 11, 112, 128, 129, 132, 136, 905

[56] References Cited

U.S. PATENT DOCUMENTS

| | | | |
|---|---|---|---|
| 1,422,655 | 7/1922 | Brehmer | 384/283 |
| 1,587,046 | 6/1926 | Spicer | 464/9 |
| 1,885,646 | 11/1932 | Warner | 464/136 X |
| 2,222,491 | 11/1940 | Scribner | 384/282 |
| 2,265,065 | 12/1941 | Daywalt et al. | 384/282 |
| 2,648,580 | 8/1953 | Lignian | 384/276 |
| 3,087,314 | 4/1963 | Jarvis et al. | 464/128 |
| 3,161,449 | 12/1964 | Flom | 384/282 |
| 3,241,336 | 3/1966 | Nemtsov | 464/132 X |
| 3,782,797 | 1/1974 | Lange et al. | 464/128 X |
| 3,950,834 | 4/1976 | Pitner | 464/128 X |
| 3,961,104 | 6/1976 | Tanner | 384/283 X |
| 4,010,625 | 3/1977 | Orain | 464/905 X |
| 4,117,916 | 10/1978 | Baker | 384/282 X |

FOREIGN PATENT DOCUMENTS

| | | | |
|---|---|---|---|
| 3017452 | 11/1981 | Fed. Rep. of Germany | 384/283 |
| 1217833 | 5/1960 | France | 464/128 |
| 718073 | 11/1954 | United Kingdom | 384/283 |

Primary Examiner—Daniel P. Stodola
Attorney, Agent, or Firm—Fay, Sharpe, Beall, Fagan, Minnich & McKee

[57] ABSTRACT

A power transmission device which includes trunnion and bearing sets for transferring power from a power generating unit to an operating unit. In the preferred embodiment of the invention, a cross is provided with a plurality of trunnions which define transfer surfaces. A bearing member in the form of a cup is provided for each of the transfer surfaces. The bearing cup is defined by a plurality of internal bearing surfaces which are integral with the bearing cup sidewall and which contact the transfer surfaces of the cross. The bearing surfaces, in the preferred embodiment, are semi-circular in cross-section and make bearing contact with the essentially cylindrical transfer surface of the cross. The bearing cup is preferably fabricated using powder metallurgy techniques which advantageously form the integral bearing surfaces within the cup, thereby eliminating the necessity for the use of balls or needles in the cup.

29 Claims, 4 Drawing Sheets

UNIVERSAL JOINT WITH BEARING CUPS HAVING INTEGRAL BEARING SURFACES

This application is a continuation-in-part of U.S. application Ser. No. 625,303, filed June 27, 1984 now abandoned, for "Power Transmission Device".

BACKGROUND OF THE INVENTION

This invention is directed to a power transmission device which includes trunnion and bearing sets for interconnecting the driving shaft of a power generating unit to a driven shaft of an operating unit in order to perform a mechanical function.

The mechanical transmission of power normally requires a transfer device which couples the power generating unit (source) to the operating unit in order to perform a mechanical function. The transfer device simultaneously couples the two units and transfers power between them. Most often, shafts are used in power transmission and are joined by the transfer device for rotational and/or reciprocating energy transfer. This arrangement is often referred to as a "drive shaft" and the transfer device is commonly called a "universal joint" where four (4) trunnions are utilized or a "tripot" where three (3) trunnions are used. The name "universal joint" is most commonly used when referring to any power transfer device regardless of the number of trunnions.

A drive shaft will normally utilize two universal joints whereas a "drive line" may use in excess of two universal joints and shafts.

The universal joint functions to (a) transmit a high starting or high stopping torque including a reversal of direction of rotation, (b) maintain a continuous transfer of power at either constant or varying drive shaft revolutions per minute, and (c) maintain a maximum power transfer between the power source and the operating unit or units during all relative drive line angle and length variations and vibrations.

A common universal joint in use today is that which is sometimes referred to as the Hooke universal joint. In the Hooke joint, the driving and driven shafts are each provided with a yoke, the respective yokes being interconnected by a cross comprised of trunnion-bearing sets. A plurality of transfer surfaces, essentially cylindrical in shape, are ground at the respective trunnions of the cross. Each trunnion transfer surface is adapted to receive a bearing cup which is provided internally with a plurality of needles. Crosses with four (4) transfer surfaces (trunnions) are in widespread use in rear wheel drive vehicles and industrial drive shafts. Similarly, tripots with three (3) transfer surfaces (or trunnions) are in widespread use in front wheel drive vehicles.

The needles used in bearing cups of prior art universal joints serve the function of reducing friction between the trunnion and the bearing cup by rolling, thereby accommodating the relatively slight movement between these members. The needles further serve the function of transferring and maintaining the transmission of torque forces between the bearing cup and the trunnion.

The use of needles in bearing cups is satisfactory insofar as the transmission of torque thru the universal joint. Needles, however, have two (2) principal drawbacks.

First, needles add a cost factor in the manufacture of universal joints both in the cost of the needles themselves and in the cost of assembly of a trunnion and bearing set due to the necessity of handling the needles in assembly. A second drawback, insofar as needles, is the fact that unless sufficiently lubricated, they will eventually wear and deteriorate to the point that the trunnion and bearing set of the universal joint must be replaced.

Somewhat similar problems are encountered in roller tappets for internal combustion engines. In particular, roller tappets are used in engine valve trains to eliminate the sliding action between the tappet and the camshaft. The rollers currently used employ needle bearings with the cost and assembly disadvantages discussed above.

The primary object of this invention is to eliminate the necessity for needles, balls or other rolling members between a trunnion and a bearing cup in a universal joint or between the shaft and roller in a roller tappet assembly.

It is a further object of this invention to eliminate the necessity for introducing lubricants such as greases and oils in a universal joint, which lubricants are normally required to insure low friction in the joint.

BRIEF DESCRIPTION OF THE INVENTION

Briefly described, one aspect of this invention provides for an improved universal joint which includes improved trunnion and bearing sets.

In a preferred embodiment, the transfer device, which may be either four trunnion, three trunnion, or two trunnion, is provided with a plurality of transfer surfaces which are essentially cylindrical in shape and which are ground at the respective ends of the trunnions. A plurality of bearing cups are provided, one for each of the trunnion bearing surfaces. The bearing cups are defined by an essentially cylindrical sidewall. The cups are normally closed ended in a cross arrangement and open ended in a tripot arrangement. Integral bearing surfaces are defined at the internal wall of the bearing cup. In the preferred embodiment, these bearing surfaces are essentially semi-circular in cross-section and extend the full depth of the cup. When the cup is placed over the end of the trunnion, the bearing surfaces are adapted to contact the transfer surface of the trunnion.

In another embodiment, a second aspect of the invention provides for an improved roller tappet assembly wherein the tappet body carries a shaft that extends transverse to the axis of the body and defines a cylindrical transfer surface. A roller unit is mounted for free rotation on the shaft with a cylindrical outer surface located outwardly of an end of the tappet body. The roller unit comprises a one piece cylindrical roller body having an axially extending central opening sized to be received on the transfer surface. A plurality of axially extending integral bearing surfaces are formed on the interior of the central opening to closely engage the transfer surface.

In the preferred embodiments, the bearing cup or the roller unit, is fabricated using powder metallurgy techniques thereby making it possible to define and produce internal bearing surfaces which are integral with the cup or the roller body.

The bearing cups or roller units may also be produced using conventional machining techniques.

Whether manufactured using powder metallurgy or machining techniques the necessity for the use of needles, balls or other rolling elements is eliminated.

DESCRIPTION OF THE PREFERRED EMBODIMENTS

A description of the preferred embodiments of the invention will now be made with reference to the accompanying figures in which.

Figure 1:
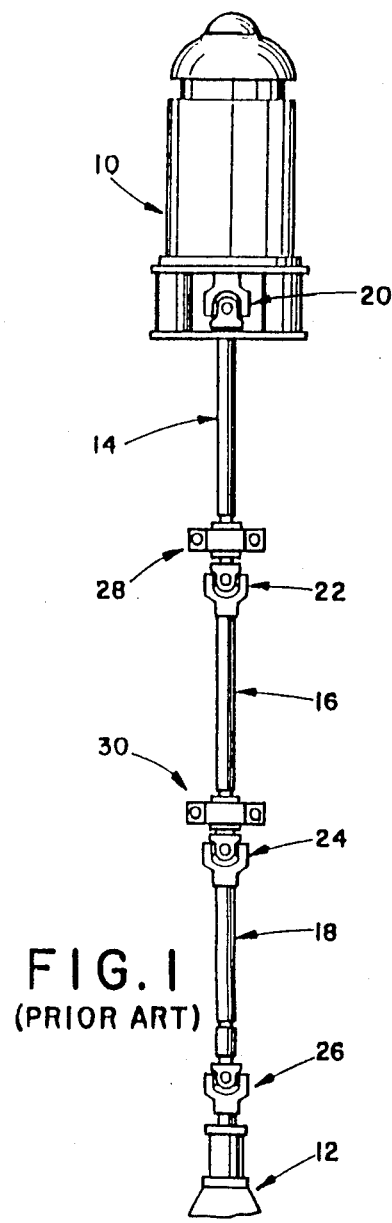
FIG. 1 is a schematic view of a drive line showing the incorporation of universal joints therein.

Attention will first be directed to FIG. 1 wherein there is shown a drive line interconnecting a power source to an operating unit. The power source in FIG. 1 is identified at 10 and may be in the form of an electric motor or, alternately, an internal combustion engine. The driven or operating unit is designated 12 in FIG. 1. A drive line interconnects the power source 10 with the operating unit 12 and is defined by a plurality of drive shafts 14, 16, 18. Universal joints 20, 22, 24 and 26 of FIG. 1 provide for an interconnection of the respective drive shafts 14, 16 and 18 with each other and with the power source 10 and the operating unit 12. Center shaft support bearings 28, 30 are advantageously used to support the drive line.

The structure of FIG. 1 generally describes and illustrates a drive line for the transmission of power from an electric motor and the like to an operating unit or load. As will be seen from FIG. 1, the universal joints perform a coupling function for the transmission of power from one member to another.

Figure 2:
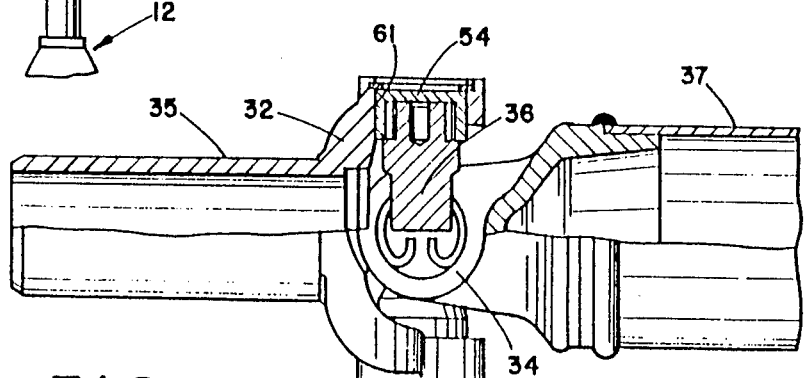
FIG. 2 is an elevational view, partly in section, showing a prior art universal joint incorporating four trunnion and bearing cup sets.

In FIG. 2, a prior art universal joint is shown. The respective drive shafts 35, 37 are provided with yokes 32, 34 which are interconnected by means of a cross 36 which includes bearing cups 54. For a description of the cross 36, attention will now be directed to FIG. 3.

Figure 3:
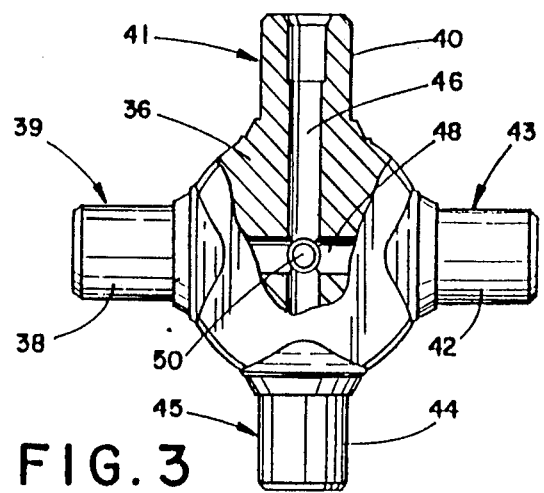
FIG. 3 is a top elevational view, partly in section, showing a prior art cross.

The cross 36 of FIG. 3 is a four trunnion load transfer element defined by trunnions 39, 41, 43, 45 and by essentially cylindrical transfer surfaces 38, 40, 42, 44 which are ground or otherwise defined at the respective trunnions. Drilled cross passages 46, 48 are provided internally of the cross and define lubricant passageways to feed lubricant from a fitting 50 which is a grease fitting or the like. Lubricant is fed from the fitting 50 thru passages 46, 48 out to the transfer surfaces 38, 40, 42 and 44, as may be seen in FIG. 3.

The lubricant passageways and fitting are provided for the purpose of enabling lubricant to be fed to the roller needles within the bearing cup as will be described below.

Figure 4:
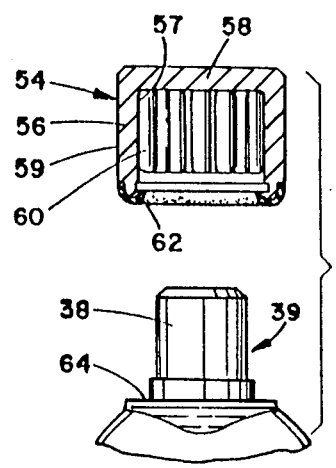
FIG. 4 is an elevational exploded view, partly in section, showing a prior art bearing cup with an associated transfer surface of a prior art trunnion.

Reference will now be made to FIG. 4 wherein a prior art roller needle bearing cup is shown before being positioned on a trunnion.

The bearing cup of FIG. 4 is designated 54 and includes a generally cylindrical sidewall 56, a generally cylindrical inner wall 57 and a closed end 58.

A plurality of roller needles 60 are positioned within the bearing cup 54 circumferentially around the internal wall 57 thereof.

A seal 62 is provided in the form of a skirt depending from the bearing cup. The seal serves the purpose of retaining the lubricant within the cup.

When the bearing cup 54 of FIG. 4 is installed on the trunnion, the roller needles 60 make contact with transfer surface 38 of the trunnion 39. The seal 62 contacts surface 64 of the trunnion and affords sealing of the internal annular chamber in which the roller needles are positioned. It can, thus, be appreciated that with reference to FIGS. 3 and 4, lubricant is fed from the fitting 50 thru passages 46, 48, and is directed into the bearing cup 54 affording lubrication for the roller needles 60.

The complete assembly of the cross and bearing cup of FIGS. 3 and 4 is shown in FIG. 2. The bearing cup 54 is received within a respective yoke 32, 34 thus providing an interconnection between the yoke and the trunnion.

The transmission of torque thru the universal joint of FIG. 2 is accomplished at the transfer surfaces of the cross, bearing cup and yoke. Specifically, such transfer surfaces are designated 38, 40, 42 and 44 in the cross, 57 and 59 in the bearing cup and 61 in the yoke.

Figure 5:
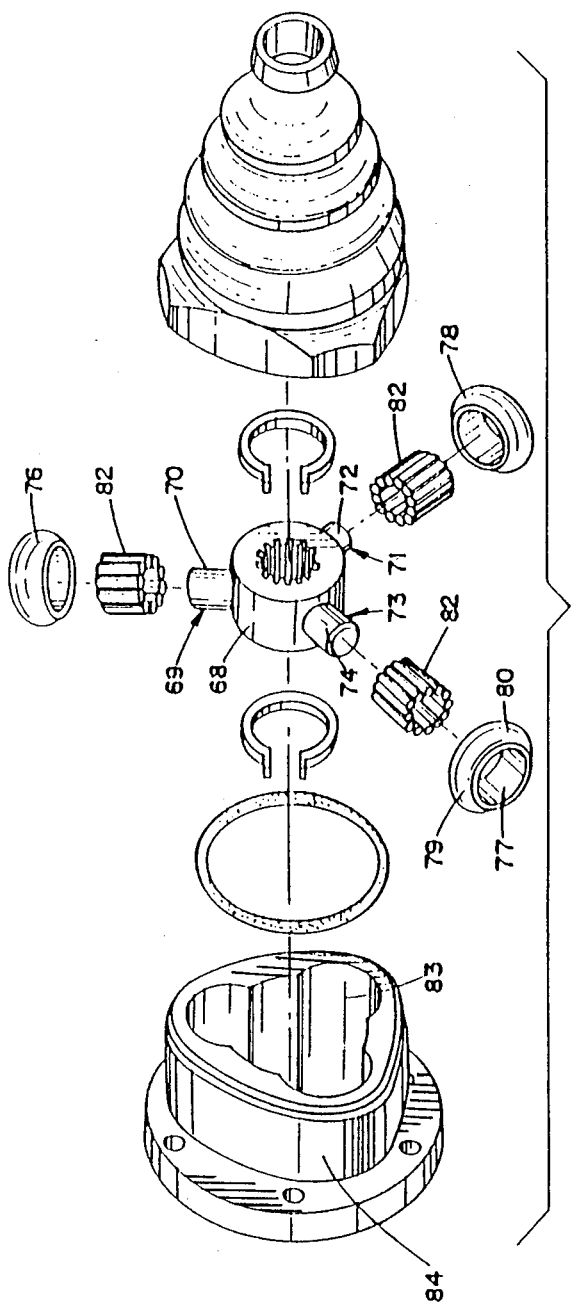
FIG. 5 is an elevational exploded view showing a three trunnion prior art tripot which is used primarily in front wheel drive vehicles.

Again with reference to prior art universal joints, a universal joint as is used in front wheel drive vehicles is shown in FIG. 5. The tripot of FIG. 5 includes three trunnions 69, 71 and 73 which define transfer surfaces 70, 72 and 74. Bearing cups 76, 78, 80 are associated with each of the respective transfer surfaces of the trunnions. The bearing cups of FIG. 5 are sometimes referred to as thru cups for the reason that the cup is open at both ends and does not include the transverse wall such as is shown at 58 in FIG. 4. A plurality of needles 82 are adapted to contact the transfer surfaces 70, 72 and 74 of the tripot of FIG. 5. The needles are retained by the respective bearing cups 76, 78, 80. The bearing cups, in turn, are received within the housing 84.

The transmission torque thru the tripot of FIG. 5 is accomplished at the transfer surfaces of the tripot, bearing cup and housing. Specifically, such transfer surfaces are designated 70, 72 and 74 in the tripot, 77 and 79 in the thru cups 76, 78 and 80 and 83 in the housing 84.

The transfer devices of FIG. 2 (universal joint) and FIG. 5 (tripot) both require the use of roller needles to reduce friction, thereby accommodating the relatively small movement between the bearing cup and the trunnion transfer surfaces. The needles further transfer and maintain torque forces between the bearing cup and the trunnion transfer surfaces.

While, in operation, a single rotation of shaft 35 of FIG. 2 will produce a single rotation of shaft 37, the cross 36 of the universal joint also makes a complete rotation. However, there is little relative movement between the trunnion transfer surfaces and the needle rollers as the cross rotates. That is to say, while the shafts 35 and 37, along with the interconnecting universal joint rotate as a unit, there is, within the bearing cup, little relative movement between the roller needles and the transfer surfaces of the trunnion. Contrary to expectations, the roller needles do not, themselves, normally make complete revolutions within the bearing cup as the universal joint rotates. It is this phenomenon of limited movement between the bearing cup and the trunnion which permits the utilization of the needleless bearing cup of this invention. The limited relative movement between the bearing cup and the trunnion further permits the utilization of powder metallurgy techniques in the manufacture of either one or both of these elements, as well as the use of oil impregnated metals to afford lubrication for the universal joint.

The amount of relative movement between the bearing cup and the trunnion has been described as being slight. Another way to describe the relative movement between the elements is to say that there is limited angular and/or longitudinal displacement between these members. In its extreme, the movement between the bearing cup and the trunnion is aperiodically oscillatory either in the longitudinal and/or the radial direction.

The recognition by applicants of the limited relative movement between the bearing cup and the trunnion while in use resulted in the examination of various structurally shaped transfer surfaces of the trunnion, the bearing cup and the trunnion and bearing cup in combination to eliminate the use of roller needles in universal joints. Specifically, the use of powder metallurgy techniques to produce trunnions and bearing cups in which there were defined integral bearing surfaces resulted.

Figure 7:
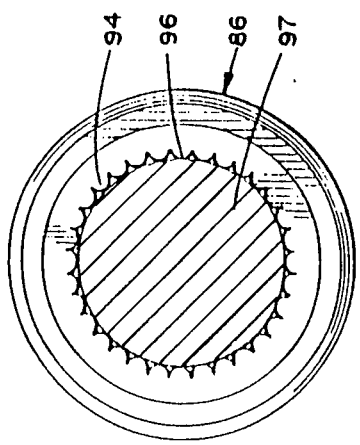
FIG. 7 is an end elevational view of the bearing cup of FIG. 6 and showing in section the transfer surface of a trunnion associated therewith.
Figure 6:
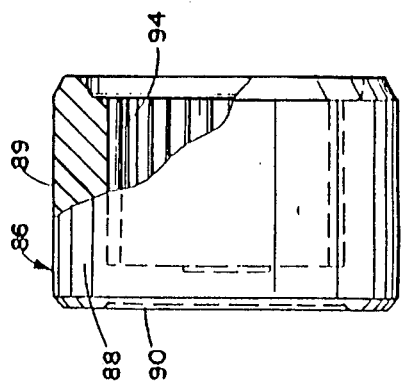
FIG. 6 is a side elevational view partly in section of the bearing cup used in the preferred embodiment of this invention.

With reference to FIGS. 6 and 7, a bearing cup manufactured utilizing powder metallurgy techniques and having internal integral bearing surfaces is shown.

With reference to FIG. 6, the improved bearing cup 86 which is an element of this invention is defined by an essentially cylindrical sidewall 88 having a cylindrical outer surface 89 and a closed end 90.

With reference to FIG. 7, a plurality of bearing surfaces 94 are defined at the internal surface of the sidewall of the cup and, in the preferred embodiment of FIG. 7, are essentially semi-circular in cross-section so as to approximate the profile of a plurality of needles arranged substantially side-by-side. As seen in FIG. 6, the bearing surfaces 94 extend from approximately the outer edge of the bearing cup inwardly throughout substantially the entire depth of the cup.

When the bearing cup 86 of FIG. 6 is positioned about an end of a trunnion, contact is made by the bearing surfaces 94 with the transfer surface of the trunnion. That transfer surface is designated 96 in FIG. 7 and is essentially a cylindrical surface which is ground or otherwise defined on the end of the trunnion 97.

The bearing surfaces 94 of FIG. 7, thus, approximate the shape of roller needles insofar as their contact with the transfer surface 96 of the trunnion. Since the bearing surfaces 94 of FIG. 7 are integral with the cup 86, there can be no relative rotation between the bearing surfaces 94 and the cup. However, as has been previously noted, since there is relatively little movement between the bearing cup and the trunnion during rotation of the drive shaft and since the roller needles of the prior art do not, themselves, rotate continuously in use, the integral bearing structure of FIG. 7 affords the advantages of roller needles insofar as bearing contact with the trunnion transfer surface but without the disadvantages of increased costs for the needles and increased costs associated with the assembly thereof.

Figure 9:
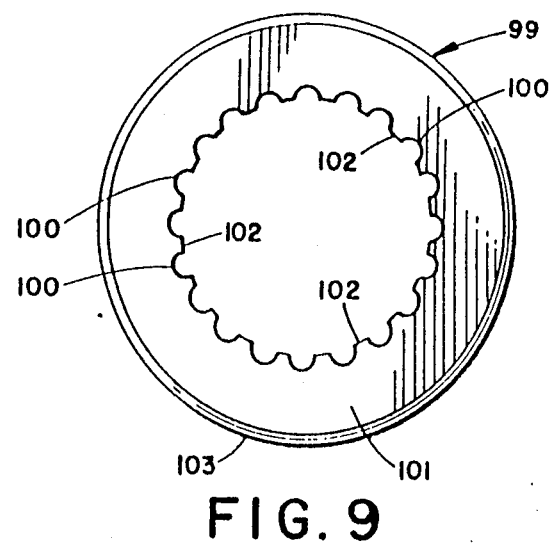
FIG. 9 is an end elevational view of a modified form of bearing cup used in the universal joint of this invention.

An alternate embodiment of the bearing cup for use in this invention is shown in FIG. 9. In FIG. 9, the bearing cup 99 is provided with a plurality of spaced, essentially semi-circular recesses 100 in the sidewall 101 of the cup which are joined together by means of bearing surfaces 102. In the embodiment of FIG. 9, the bearing surfaces 102 are defined as segments of a cylindrical surface having a land width of approximately 0.030 inches. The outside surface of cup 99 is essentially cylindrical as shown at 103.

Figure 10:
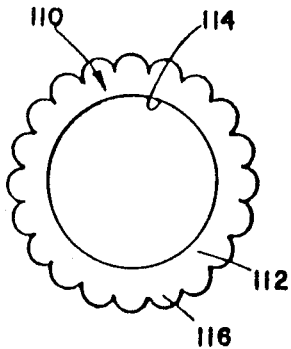
FIG. 10 is an end elevational view of a modified bearing cup of this invention.

A further modified or alternate embodiment of the invention is shown in FIG. 10. In FIG. 10, the bearing cup 110 is provided with a sidewall 112 which includes an essentially cylindrical internal surface 114. At the outside surface of sidewall 112 there are provided a plurality of bearing surfaces 116 which, in the embodiment of FIG. 10, are essentially semi-circular in cross-section so as to approximate the profile of a plurality of needles arranged substantially side-by-side. The embodiment of FIG. 10 is, thus, a reversal of the bearing surfaces from that shown in FIG. 7. Whereas, in FIG. 7, the bearing surfaces are defined at the internal surface of the bearing cup, such bearing surfaces are defined, in FIG. 10, at the external surface thereof. The bearing cup of FIG. 10, like that of FIG. 7, is a closed end cup particularly adapted for use with the four trunnion cross of FIG. 3.

In a still further modified form of this invention, the bearing cup may be provided with bearing surfaces on both the internal and external walls thereof. Although not shown in the drawings, it should be understood that such structure would include the internal bearing surfaces 94 of FIG. 7 and the external bearing surfaces 116 of FIG. 10.

Figure 11:
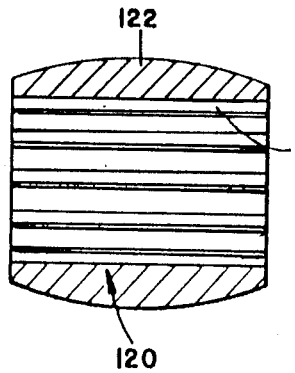
FIG. 11 is a side elevational view, partly in section, of a thru cup of this invention.

FIG. 11 shows a bearing cup of this invention of the thru type. The bearing cup of FIG. 11, thus, has application in transfer devices such as that shown in FIG. 5. The bearing cup of FIG. 11 is a thru cup 120 having a convex external surface 122 which is adapted to be received within the housing 84 of FIG. 5 to make contact with the housing transfer surface 83. The internal wall of the bearing cup of FIG. 11 includes a plurality of bearing surfaces 124 which are of the type shown in FIGS. 6 and 7. That is to say, the bearing surfaces 124 of the thru cup of FIG. 11 are generally semi-circular in cross-section and approximate the profile of a plurality of adjacent needles.

Figure 12:
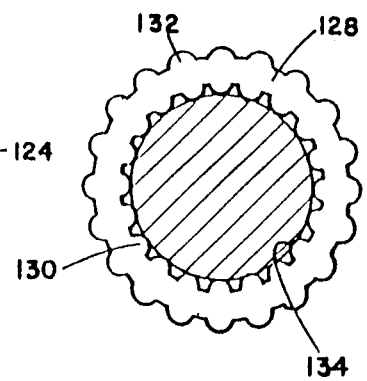
FIG. 12 is an end elevational view of a modified thru cup of this invention and showing, in section, the trunnion transfer surface and housing associated therewith.

A still further modified form of bearing cup is shown in FIG. 12. The bearing cup 128 of FIG. 12 has bearing surfaces defined at both the internal and external walls of the cup. Bearing surfaces 130 are defined at the internal wall of cup 128 and bearing surfaces 132 are defined at the external wall thereof. The internal bearing surfaces 130 of FIG. 12 are adapted to make contact with the trunnion transfer surface 134. The external bearing surfaces 132 are adapted to make contact with the housing bearing surface which is that designated 83 in FIG. 5.

The bearing surfaces of this invention may take many different forms and shapes depending upon design considerations. While in the preferred embodiment of the invention the bearing surfaces are shown as being essentially semi-circular in cross-section so as to approximate the profile of adjacent roller needles, it should be appreciated that other bearing shapes may be used within the spirit of this invention.

Figure 13A:
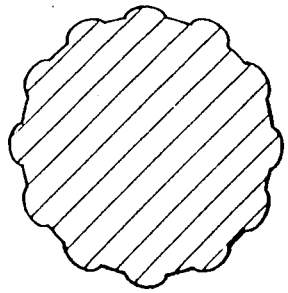
FIGS. 13a, 13b, 13c show variations of bearing surfaces.

The profile of bearing surface as shown in FIG. 13a is defined by elliptical curves.

Figure 13B:
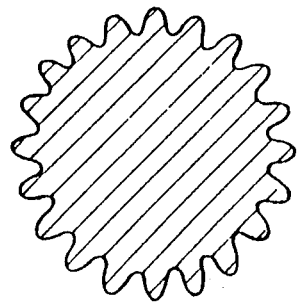

The profile of bearing surface as shown in FIG. 13b is defined by curves approximating that of a sine wave.

Figure 13C:
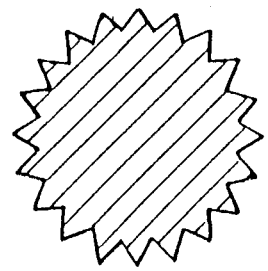

The bearing surface profile of FIG. 13c approximates that of closely spaced triangular members having either sharp or slightly rounded points.

The bearing surfaces of this invention may provide for a wide variety of contact points and contact areas including, but not limited to, line contact, point-to-point contact, line to cylinder contact, cylinder-to-cylinder contact, spherical contact, pyramidal contact, planar area-to-planar area contact, to name a few.

The preferred embodiment of bearing cup shown in FIGS. 6 and 7 and the alternate embodiments shown in FIGS. 9–13 may be manufactured using powder metallurgy techniques. These techniques afford the ability of forming the bearing surfaces to a precise degree and in a variety of shapes.

The structure of FIGS. 6, 7 and 9–13 may also be fabricated using conventional forming techniques such as drilling, broaching and the like.

Figure 8:
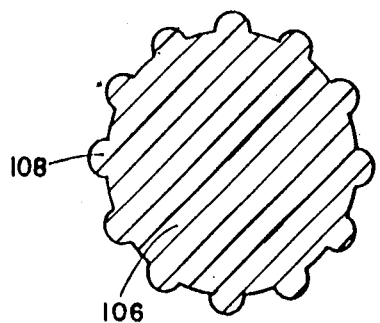
FIG. 8 is a schematic view showing a modified embodiment of a trunnion for use in connection with the universal joint of this invention.

While, thus far, the formation of the bearing surfaces has been described with reference to the bearing cup, it should also be appreciated that this invention includes structures in which the bearing surfaces are defined on the load transfer element (cross or tripot). Reference is made to FIG. 8 wherein there is shown end 106 of a trunnion and in which a plurality of bearing surfaces 108 are defined on the trunnion. Bearing surfaces 108 are defined by spaced apart bearing members having a semi-circular cross-section. It should be understood that when the bearing surfaces are defined on the trunnion, the bearing cup or transfer member which is received over the trunnion has an essentially uninterrupted cylindrical internal surface or transfer surface against which the bearing surfaces 108 bear when the trunnion and cup are assembled.

It should be understood that utilization of powder metallurgy techniques permits the fabrication of many surface design configurations and shapes, thereby permitting essentially any theoretically or empirically determined structured bearing shapes from convex to concave.

As has been noted above, powder metallurgy techniques may be advantageously used to manufacture the various elements of this invention. In manufacturing a part using powder metallurgy techniques, three basic steps are normally employed, i.e., mixing, compacting and sintering.

In mixing, elemental or pre-alloyed metal powders are first mixed with lubricants or other alloy additions to produce a homogenous blend of ingredients.

In compacting, a controlled amount of mixed powder is gravity fed into a precision die and is compacted at varying pressures and temperatures depending upon the density requirements of the part.

In sintering, the compact is caused to be passed thru a controlled-atmosphere furnace. The part is heated to below the melting point of the base metal and held at the sintering temperature for a desired time before being cooled.

After sintering, the part may be impregnated with additional lubricant, machined, plated or heat treated.

Impregnation with oil or a resin after sintering is particularly advantageous to this invention as it affords a means to supply sufficient lubrication to the universal joint without the necessity of additional grease therein eliminating the need for the grease fitting and lubricant wells.

Impregnation of powder metallurgy parts may be achieved by soaking the parts in heated oil or by vacuum techniques. When the part is heated by friction in use, the oil expands and flows to the bearing surface. On cooling, the oil returns into the metallic pores of the part by capillary action.

Figure 14:
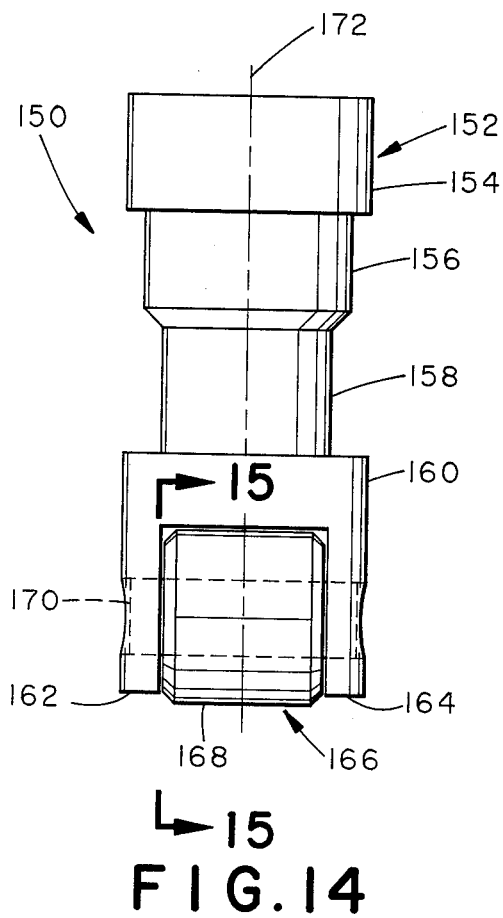
FIG. 14 is a side elevational view of a roller tappet which incorporates a roller unit formed in accordance with an embodiment of the invention.
Figure 15:
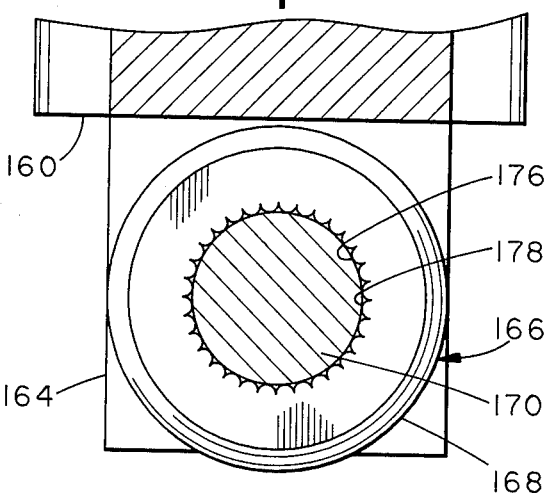
FIG. 15 is a partial cross-sectional view taken on line 15—15 of FIG. 14.
Figure 16:
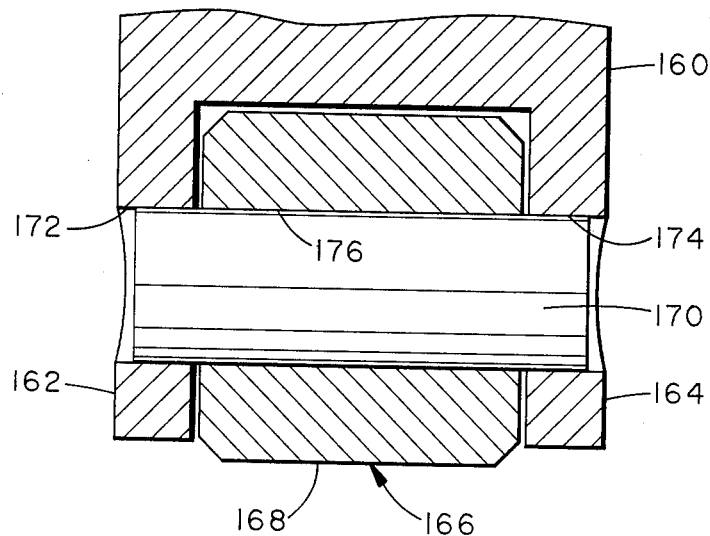
FIG. 16 is a cross-sectional view taken on line 16—16 of FIG. 15.

FIGS. 14–16 illustrate a further embodiment of the invention incorporated in a roller tappet assembly. As best shown in FIG. 14, the roller tappet assembly 150 comprises an elongated body 152 having a generally cylindrical configuration including stepped diameter portions 154, 156 and 158. The lower end portion 160 of body 152 preferably has a diameter equal to the diameter of portion 154. Although the invention could be incorporated in either hydraulic or mechanical tappets, the illustrated embodiment is a hydraulic tappet and the upper portion of body 152 includes the usual check valve and plunger units.

The lower end 160 of body 152 is bifurcated to provide a pair of downwardly extending leg portions 162 and 164. Mounted for free rotation between the leg portions 162 and 164 is a roller unit 166 which has a cylindrical outer surface 168. In the embodiment illustrated, the roller unit 166 is mounted such that its cylindrical surface 168 extends outwardly of the lower end of the tappet body for controlling and driving from the associated conventional cam assembly (not shown).

The roller unit 166 is suitably mounted in the body 152 by a support shaft 170 which extends transversely of the longitudinal axis 172 of the main body 152. The shaft 170 is cylindrical and is press fitted or otherwise firmly affixed in suitably aligned cylindrical openings 172 and 174 formed in leg portions 162 and 164, respectively.

The roller unit 166 includes an axial center opening 176 which is sized so as to be closely received on the outer surface of shaft 170. According to the subject invention, the interior surface of opening 176 is configured to define a multiplicity of bearing surfaces 178 which extend axially of the roller unit 166 and are formed integrally with the body of the roller unit 166 so that the roller body and the bearing surfaces are a single one piece unit. In the preferred embodiment, and as illustrated in FIG. 15, the bearing surfaces 178 are essentially semi-circular in cross-section so as to approximate the profile of a plurality of needles arranged substantially side-by-side. In addition, the bearing surfaces 198 extend substantially the full width of the roller unit 166.

When the roller unit 166 of FIG. 15 is mounted on the shaft 170, as shown, contact is made by the bearing surfaces 178 with the outer or transfer surface of shaft 170 uniformly thereabout. The bearing surfaces 178 approximate the shape and contact of roller needles insofar as concerns their contact and engagement with the outer surface of shaft 178. As previously discussed, the integral bearing structure thus generally affords the advantages and functioning of roller needles without the disadvantages of the cost and assembly problems associated with such roller needles.

It should be appreciated that although the configuration of the bearing surfaces 178 is illustrated as generally semi-circular in cross-section, the configurations previously shown and discussed with reference to FIG. 8-13C could equally well be used.

In the preferred embodiments of this invention, high carbon steel powder material is used for either one or both of the bearing cup and the trunnion.

ADVANTAGES OF THE INVENTION

This invention affords a number of advantages not found in prior art structures.

First, material costs of the universal joint are reduced thru the elimination of roller needles, the grease fitting and grease in the cross or tripot. As a consequence, the skirt seal of prior art structures such as shown at 62 in FIG. 4 may be eliminated in favor of a standard "O" ring. The "O" ring need serve only to shield the internal surfaces of the cup against foreign matter. It need not retain grease within the cup since lubrication is provided by means of the oil impregnated cup material.

Further cost reductions are possible by the use of this invention as assembly labor is reduced, there being no requirement to position a plurality of roller needles in the bearing cup or roller unit prior to placement of the cup or roller unit.

Still further cost reductions are inherent in the elimination of the internal lubricant passages of the trunnion, the lubrication wells and the grease fitting along with the tapped hole necessary to retain the fitting in place on the trunnion.

Significant cost reduction also occurs thru this invention in employing powder metals. Powder metal processing provides a product in net or near net shape, thereby eliminating the need for turning, machining and grinding surfaces along with associated equipment. By fabricating both the trunnion and the bearing cup from powdered metals, essentially all machining, grinding and surface polishing operations are eliminated.

Installation and maintenance procedures are simplified with this invention. Without loose needles, installation time is reduced. Risk of surface contamination by the introduction of foreign matter is also reduced since needles that may have fallen out of the bearing cup or roller unit during maintenance or installation do not exist.

The elimination of grease from the fitting greatly simplifies maintenance.

What is claimed is:
1. A power transmission system comprising:
   a. a driving shaft;
   b. a driven shaft;
   c. a universal joint interconnecting said driving and driven shafts;
   d. said universal joint including a driving yoke fixed to said driving shaft and a driven yoke fixed to said driven shaft;
   e. said universal joint further including a load transfer element having a plurality of trunnions, each trunnion defining a transfer surface, and a plurality of bearing members, a bearing member being associated with each of said transfer surfaces;
   f. each of said bearing members being in direct contact with a respective transfer surface, the interface of said bearing member and said transfer surface being defined by a cylindrical transfer surface in contact with an interrupted internal wall of said bearing member defining a plurality of bearing surfaces, said cylindrical transfer surface and said bearing surfaces being moveable with respect to each other;
   g. said bearing member having an external wall fixed to a respective yoke;
   h. said bearing surfaces and said bearing member being integral and formed from the same continuous homogenous material, there being no junction or interface between said bearing surfaces and the external wall of the bearing member.

2. The invention of claim 1 in which said bearing surfaces are essentially semi-circular in cross-section.

3. The invention of claim 2 in which said bearing surfaces extend substantially the length of said member.

4. The invention of claim 1 in which said bearing surfaces are defined by segments of a cylindrical surface.

5. The invention of claim 1 in which said bearing surfaces are essentially elliptical in cross-section.

6. The invention of claim 1 in which said bearing surfaces are essentially sinusoidal in cross-section.

7. The invention of claim 1 in which said bearing surfaces are essentially triangular in cross-section.

8. The invention of claim 1 in which said bearing surfaces are defined by curved surfaces.

9. The invention of claim 8 in which said curved surfaces are convex.

10. The invention of claim 8 in which said curved surfaces are concave.

11. The invention of claim 1 in which said member has a closed end.

12. A bearing member for use in a universal joint interconnecting a driving shaft and a driven shaft, the universal joint including a driving yoke fixed to the driving shaft and a driven yoke fixed to the driven shaft and a load transfer element having a plurality of trunnions, each trunnion defining a transfer surface for receiving a respective bearing member, said bearing member comprising:
   a. an interrupted internal wall defining a plurality of bearing surfaces adapted to be in direct contact with a respective transfer surface, the interface of said bearing member and the transfer surface being defined by a cylindrical transfer surface in contact with said bearing surfaces, the cylindrical transfer surface and said bearing surfaces being moveable with respect to each other;
   b. said bearing member having an external wall adapted to be fixed in a direct engagement with a respective yoke;
   c. said bearing surfaces and said bearing member being integral and formed from the same continuous homogenous material, there being no junction or interface between said bearing surfaces and the external wall of said bearing member.

13. The invention of claim 12 in which said bearing surfaces are defined by curved surfaces.

14. The invention of claim 13 in which said curved surfaces are convex.

15. The invention of claim 13 in which said curved surfaces are concave.

16. The invention of claim 12 in which said member has a closed end.

17. A universal joint kit for use in a universal joint interconnecting a driving shaft and a driven shaft, said universal joint kit comprising:
   a. a load transfer element having a plurality of trunnions, each trunnion defining a transfer surface, and a plurality of bearing members, a bearing member being associated with each of said transfer surfaces;
   b. each of said bearing members being in direct contact with a respective transfer surface, the interface of said bearing member and said transfer surface being defined by a cylindrical transfer surface in contact with an interrupted internal wall of said bearing member defining a plurality of bearing surfaces, said cylindrical transfer surface and said bearing surfaces being moveable with respect to each other;
   c. said bearing member having an external wall adapted to be fixed in direct engagement with a yoke of the driving shaft or driven shaft;
   d. said bearing surfaces and said bearing member being integral and formed from the same continuous homogenous material, there being no junction or interface between said bearing surfaces and the external wall of the bearing member.

18. The invention of claim 17 in which said bearing surfaces are essentially semi-circular in cross-section.

19. The invention of claim 18 in which said bearing surfaces extend substantially the length of said member.

20. The invention of claim 17 in which said bearing surfaces are defined by segments of a cylindrical surface.

21. The invention of claim 17 in which said bearing surfaces are defined by elliptical surfaces.

22. The invention of claim 17 in which said bearing surfaces are defined by sinusoidal surfaces.

23. The invention of claim 17 in which said bearing surfaces are defined by essentially triangular shaped surfaces.

24. The invention of claim 17 in which said bearing surfaces are defined by curved surfaces.

25. The invention of claim 24 in which said curved surfaces are convex.

26. The invention of claim 24 in which said curved surfaces are concave.

27. The invention of claim 17 in which said member has an essentially cylindrical sidewall and a closed end.

28. A universal joint kit for use in interconnecting a driving shaft and a driven shaft, said universal joint kit being defined by:
   a. a load transfer element having a plurality of trunnions, and a plurality of transfer members, a transfer member being associated with each of said trunnions;
      1. each of said transfer members being in direct contact with a respective trunnion, the interface of said transfer member and said trunnion being defined by an essentially cylindrical transfer surface of the transfer member in contact with an interrupted external wall of said trunnion defining a plurality of bearing surfaces, said cylindrical transfer surface and said bearing surfaces being moveable with respect to each other;
      2. said transfer member having an external surface adapted to be fixed to a yoke of the driving shaft or driven shaft;
      3. said bearing surfaces and said trunnion being integral and formed from the same continuous homogenous material, there being no junction or interface between said bearing surfaces and the body of the trunnion.

29. The invention of claim 28 in which said bearing surfaces are semi-circular in cross section.

* * * * *